(12) United States Patent
Dorgan et al.

(10) Patent No.: US 11,958,031 B2
(45) Date of Patent: Apr. 16, 2024

(54) BIOMIMETIC CHEMOCATALYTIC CASCADES OF DEGRADABLE POLYMERS

(71) Applicant: Board of Trustees of Michigan State University, East Lansing, MI (US)

(72) Inventors: John R. Dorgan, East Lansing, MI (US); Bin Tan, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 583 days.

(21) Appl. No.: 17/324,392

(22) Filed: May 19, 2021

(65) Prior Publication Data

US 2021/0362121 A1     Nov. 25, 2021

Related U.S. Application Data

(60) Provisional application No. 63/027,260, filed on May 19, 2020.

(51) Int. Cl.
| | |
|---|---|
| *C08G 64/34* | (2006.01) |
| *B01J 19/00* | (2006.01) |
| *C08B 3/24* | (2006.01) |
| *C08G 63/08* | (2006.01) |
| *C08G 63/91* | (2006.01) |
| *C08L 1/12* | (2006.01) |
| *D01F 8/02* | (2006.01) |
| *D01F 8/14* | (2006.01) |
| *D01F 11/02* | (2006.01) |

(52) U.S. Cl.
CPC ............. *B01J 19/0033* (2013.01); *C08B 3/24* (2013.01); *C08G 63/08* (2013.01); *C08G 63/912* (2013.01); *C08L 1/12* (2013.01); *D01F 8/02* (2013.01); *D01F 8/14* (2013.01); *D01F 11/02* (2013.01); *B01J 2219/00038* (2013.01)

(58) Field of Classification Search
USPC ....................................................... 528/392
See application file for complete search history.

(56) References Cited

U.S. PATENT DOCUMENTS 3,379,792 A     4/1968   Finholt

OTHER PUBLICATIONS

Suzuki, Y., et al., "Kinetics and Temperature evolution during the bulk polymerization of methyl methacrylate for vacuum-assisted resin transfer molding," Composites Part A: Applied Science and Manufacturing, 104, pp. 60-67 (Oct. 23, 2017).
Collins, Nick, et al., "Effect of Degradable Fiber Composition and Shape on Proppant Suspension," SPEE/APG (2018).
Rorrer, Nicholas A., et al., "Biomass-derived monomers for performance-differentiated fiber reinforced polymer composites," Green Chemistry (Mar. 14, 2017).
Wilson, A. Nolan, et al., "Integrated Biorefining: Coproduction of Renewable Resol Bioploymer for Aqueous Stream Valorization," American Chemical Society, Sustainable Chemistry & Engineering 5(8), pp. 6615-6625 (Jul. 13, 2017).

*Primary Examiner* — Terressa Boykin
(74) *Attorney, Agent, or Firm* — Harness, Dickey & Pierce, PLC

(57) ABSTRACT

A method of simultaneously modifying degradation rates of at least two compounds including a first compound having a first unmodified degradation rate constant $k_1$ and a second compound having a second unmodified degradation rate $k_2$ is provided. The method includes combining a first composition including the first compound with a second composition including the second compound, degrading the first compound and forming a first degradation product; and degrading the second compound and forming a second degradation product. The second degradation product modifies the first unmodified degradation rate constant $k_1$ of the first compound to a first modified degradation rate $k_{1'}$ and the first degradation product modifies the second unmodified degradation rate $k_2$ of the second compound to a second modified degradation rate $k_{2'}$. Compositions resulting from the method are also provided.

30 Claims, 12 Drawing Sheets

BIOMIMETIC CHEMOCATALYTIC CASCADES OF DEGRADABLE POLYMERS

CROSS-REFERENCE TO RELATED APPLICATIONS

This application claims the benefit of U.S. Provisional Application No. 63/027,260, filed on May 19, 2020. The entire disclosure of the above application is incorporated herein by reference.

FIELD

The present disclosure relates to the development of non-biological systems that mimic biological chemocatalytic cascades.

BACKGROUND

This section provides background information related to the present disclosure which is not necessarily prior art.

Living systems perform chemistry using enzyme catalysts. Biosynthetic pathways involve both sequential and parallel reactions and are referred to as enzyme cascades. For instance, enzyme-initiated spontaneous domino reactions are recognized as sequential cascades, while prochiral ketone and chiral alcohol coupled redox under the catalyst of an alcohol dehydrogenase are categorized as parallel cascades. Advances in biocatalysis are defining new developments in synthetic biology. The ability to manipulate cascading sequences of enzymatic transformations is advancing rapidly. Enzyme cascades of impressive complexity have been demonstrated over the past decades. Additionally, using enzymes to perform chemical synthesis and conducting catalytic cascade reactions for one-pot organic synthesis have been reported. However, optimized reaction parameters and precise control over these natural systems are still not possible for some of these reaction systems due to compatibility issues with reactants, solvents, temperature, pH, and other biocatalyst requirements.

Controlling the rate of degradation of materials is important in a wide variety of applications. For example, agricultural mulch films are used to retain moisture and suppress the growth of weeds and must maintain integrity for the growing season; however, it would be advantageous if these films would subsequently degrade rather than having to be physically removed from the field. Coatings and matrices used for the controlled release of fertilizers, herbicides, and pesticides have similar requirements. In medicine, biodegradable materials are used as scaffolds in wound healing dressings, as cardiovascular stents, and as screws and other load bearing elements. Similarly, the formulation of orally administered drugs like ibuprofen involves the selection of materials having different degradation rates in the human gut. The rate of degradation of diverting and suspending agents is also important in oil field services. Food and product packaging materials are another area where the rate of decomposition is of practical interest. Also, in chemical recycling of post-consumer plastics, it is generally preferable that the chemical degradation of polymer back to monomer proceeds quickly.

To overcome limitations intrinsic to the use of enzymes, especially the requirement of operating at low temperatures where rates of reaction are slow, the development of fully synthetic but biomimicking chemical cascades is desirable.

SUMMARY

This section provides a general summary of the disclosure, and is not a comprehensive disclosure of its full scope or all of its features.

The present disclosure is related to biomimetic chemocatalytic cascades of degradable polymers.

In various aspects, the current technology provides a method of simultaneously modifying degradation rates of at least two compounds including a first compound having a first unmodified degradation rate constant $k_1$ and a second compound having a second unmodified degradation rate $k_2$, the method including combining a first composition including the first compound with a second composition including the second compound, degrading the first compound and forming a first degradation product, and degrading the second compound and forming a second degradation product, wherein the second degradation product modifies the first unmodified degradation rate constant $k_1$ of the first compound to a first modified degradation rate and the first degradation product modifies the second unmodified degradation rate $k_2$ of the second compound to a second modified degradation rate $k_{2'}$, wherein either a first negative feedback loop is formed when is less than $k_1$ or a first positive feedback loop is formed when is greater than $k_1$, and wherein either a second negative feedback loop is formed when $k_{2'}$ is less than $k_2$ or a second positive feedback loop is formed when $k_{2'}$ is greater than $k_2$.

In one aspect, the first compound and the second compound are independently selected from the group consisting of polyesters, esters, cellulose esters, carboxylic acids, alcohols, acyl halides, polyamides, amides, amines, polyurethanes, urethanes, isocyanates, aldehydes, polyketones, ketones, polyethers, ethers, polyepoxides, epoxides, polycarbonates, carbonates, anhydrides, polysulfones, sulfones, polysulfoxides, sulfoxides, polyolefins, alkanes, alkenes, alkynes, polyazides, azides, polynitriles, nitriles, nitros, polyarenes, lignin, arenes, polyphenols, phenols, carbohydrates, sugars, polythiols, thiols, organometalics, and combinations thereof.

In one aspect, the first compound and the second compound independently degrade by a mechanism selected from the group consisting of hydrolysis, acidolysis, alcoholysis, aminolysis, ammonolysis, pyrolysis, and combinations thereof.

In one aspect, the first compound is selected from the group consisting of esters, polyesters, and combinations thereof, and the second compound is selected from the group consisting of esters, polyesters, cellulose esters, amides, polyamides, water, methanol, ethylene glycol, low molecular weight amines, ammonia, mineral acids, organic acids, mineral bases, organic bases, and combinations thereof.

In one aspect, the first compound is polylactide; the second composition includes water and the second compound, the second compound being cellulose acetate, cellulose acetate propionate copolymers, cellulose acetate butyrate copolymers, cellulose propionate, cellulose butyrate, or combinations thereof; and the first negative feedback loop is formed.

In one aspect, the polylactide is a product of polymerizing a mixture including LL-lactide monomers, LD-lactide monomers, and DD-lactide monomers.

In one aspect, the polylactide has a degree of crystallinity resulting from heating, cooling, deformation, or combinations thereof.

In one aspect, the polylactide is branched, the polylactide being synthesized from a reaction mixture including either a multifunctional initiator selected from the group consisting of polyols, polysaccharides, poly(vinyl alcohol), mevalonolactone, glycidol, and combinations thereof or a branching agent selected from the group consisting of peroxides, trimethylolpropane tris(2-methyl-1-aziridinepropionate) (TTMAP), multifunctional acrylates, copolymers of styrene-glycidyl acrylate, and combinations thereof.

In one aspect, the first compound is polylactide; the second composition includes water and the second compound, the second compound being poly(ethylene terephthalate), poly(ethylene terephthalate-co-ethylene naphthalate) copolymers, poly(ethylene napthalate), or combinations thereof; and the first positive feedback loop is formed.

In one aspect, the first compound is polycaprolacton and the second composition includes water and the second compound, the second compound being polylactide.

In one aspect, the first compound is poly(hexamethylene adipamide); the second composition includes water and the second compound, the second compound being polylactide; and the first positive feedback loop is formed.

In one aspect, the first compound is a biological protein; the second composition includes water and the second compound, the second compound being polylactide; and the first positive feedback loop is formed.

In one aspect, the first compound is a biological protein; the second composition includes water and the second compound, the second compound being polylactide; and the first negative feedback loop is formed.

In one aspect, the first compound includes polymeric fibers having a diameter of less than or equal to about 1 mm and a length to diameter ratio of greater than or equal to about 10.

In one aspect, the combining the first composition with the second composition results in fibers including the first and second compounds, the fibers having a diameter of less than or equal to about 1 mm and a length to diameter ratio of greater than or equal to about 10.

In one aspect, the first compound and the second compound are particles having shapes individually selected from the group consisting of spheres, cylinders, cubes, flakes, and irregular shapes having high surface area to volume ratios.

In one aspect, the combining the first composition with the second composition results in particles including the first and second compounds, the particles having shapes selected from the group consisting of spheres, cylinders, cubes, flakes, and irregular shapes having high surface area to volume ratios.

In one aspect, the particles are free flowing and have a mean particle diameter of less than or equal to about 2.5 cm.

In various aspects, the current technology also provides a method of forming at least one regulatory loop for controlling reaction rates in a polymer blend, the method including combining a first composition including a first compound capable of forming a first degradation product at a first unmodified degradation rate defined by $k_1$ with a second composition including a second compound capable of forming a second degradation product at a second unmodified degradation rate defined by $k_2$ to form the polymer blend, wherein the second degradation product is formed in the polymer blend and modifies $k_1$ to and wherein the first degradation product is formed in the polymer blend and modifies $k_2$ to $k_{2'}$.

In one aspect, is less than $k_1$ and $k_{2'}$ is greater than $k_2$.

In one aspect, is greater than $k_1$ and $k_{2'}$ is less than $k_2$.

In one aspect, the first compound is polylactic acid and the second compound is cellulose acetate.

In one aspect, the method further includes combining a third composition with the first composition and the second composition, the third composition including a third compound being capable of forming a third degradation product at a third unmodified degradation rate defined by $k_3$, wherein at least one of the first degradation product or the second degradation product modifies $k_3$ to $k_{3'}$.

The current technology yet further provides a composition including a first compound that degrades and forms a first degradation product at a first degradation rate defined by and a second compound that degrades and forms a second degradation product at a second degradation rate defined by $k_{2'}$, wherein is different from an unmodified degradation rate of the first compound defined by $k_1$ when the first compound is not combined with another compound and wherein $k_{2'}$ is different from an unmodified degradation rate of the second compound defined by $k_2$ when the second compound is not combined with another compound.

In one aspect, the first compound and the second compound are polymers.

In one aspect, the composition is in the form of a fiber.

In one aspect, the fiber has a diameter of less than or equal to about 1 mm and a length to diameter ratio of greater than or equal to about 10.

In one aspect, the composition is in the form of a particle having a shape selected from the group consisting of a sphere, a cylinder, a cube, a flake, and an irregular shape having a high surface area to volume ratio.

In one aspect, is less than $k_1$ and $k_{2'}$ is greater than $k_2$.

In one aspect, is greater than $k_1$ and $k_{2'}$ is less than $k_2$.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1A:
FIG. 1A show a first degradation reaction having a first unmodified degradation rate defined by $k_1$.
Figure 1B:
FIG. 1B show a second degradation reaction having a second unmodified degradation rate defined by $k_2$.
Figure 1C:
FIG. 1C show a third degradation reaction having a third unmodified degradation rate defined by $k_3$.
Figure 1D:
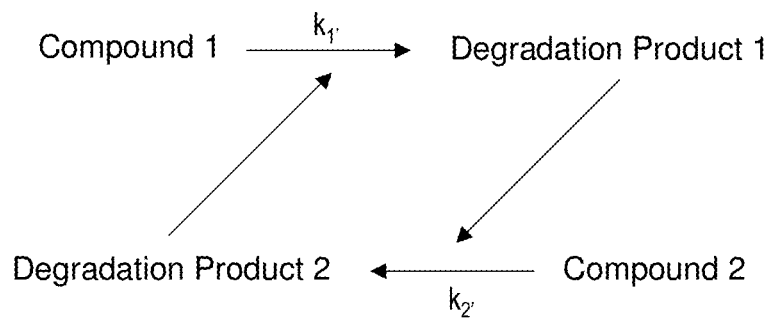

FIG. 1D shows a two-compound blend in accordance with the current technology. In the blend, a first compound, Compound 1, degrades into a first degradation product, Degradation Product 1, and a second compound, Compound 2, degrades into a second degradation product, Degradation Product 2. Simultaneously, Degradation Product 2 modifies the degradation rate of Compound 1 and Degradation Product 1 modifies the degradation rate of Compound 2.

Figure 1E:
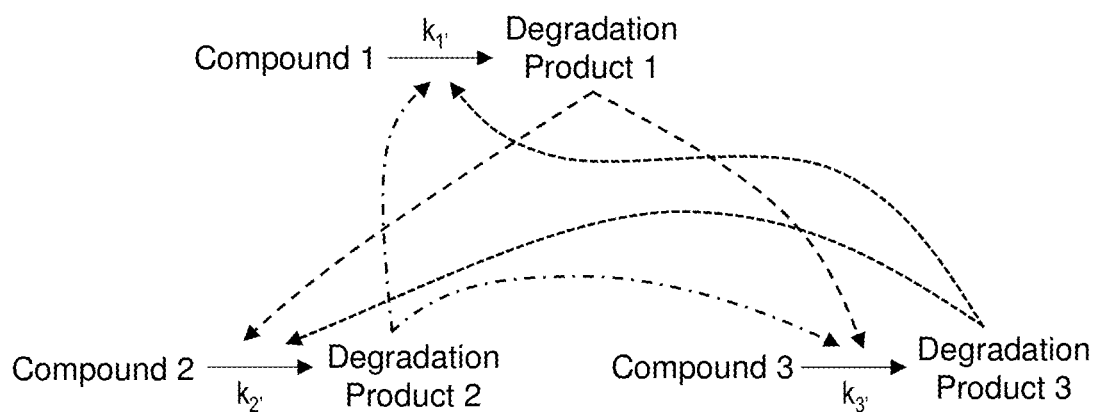

FIG. 1E shows a three-compound blend in accordance with the current technology. In the blend, a first compound, Compound 1, degrades into a first degradation product, Degradation Product 1, a second compound, Compound 2, degrades into a second degradation product, Degradation Product 2, and a third compound, Compound 3, degrades into a third degradation product, Degradation Product 3. Degradation Product 1 modifies at least one of $k_2$ to $k_{2'}$ or $k_3$ to $k_{3'}$, Degradation Product 2 modifies at least one of $k_1$ to or $k_3$ to $k_{3'}$, and Degradation Product 3 modifies at least one of $k_1$ to or $k_2$ to $k_{2'}$.

Figure 2A:
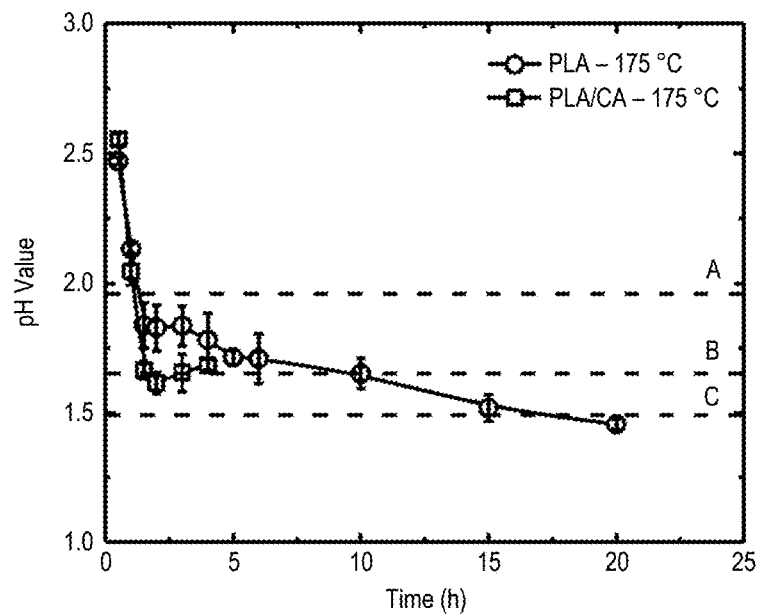

FIG. 2A is a graph showing pH values of aqueous solutions after hydrolysis at 175° C. Dotted lines A, B, and C respectively indicate the estimated pH value for 50 wt. % cellulose acetate (CA), 25 wt. % polylactide (PLA), and 50 wt. % PLA in deionized (DI) water after full hydrolysis of ester bonds.

Figure 2B:
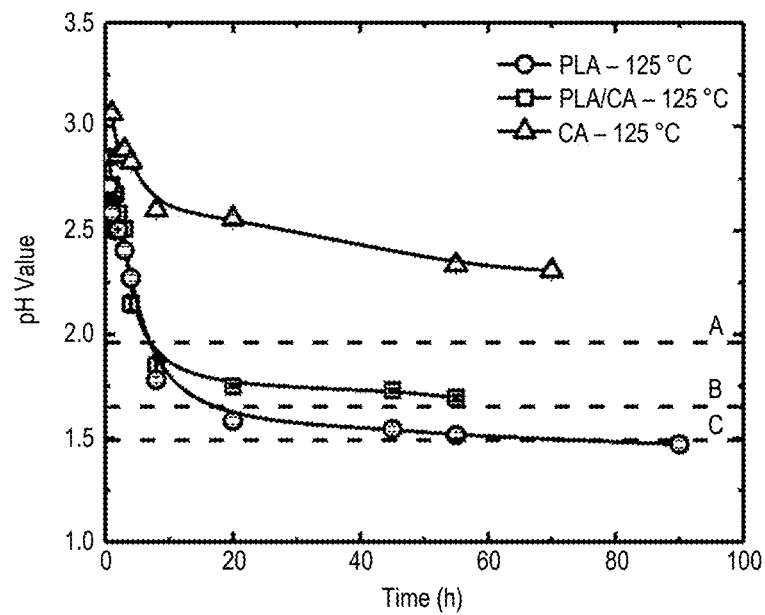

FIG. 2B is a graph showing pH values of aqueous solutions after hydrolysis at 125° C. Dotted lines A, B, and C respectively indicate the estimated pH value for 50 wt. % CA, 25 wt. % PLA, and 50 wt. % PLA in DI water after full hydrolysis of ester bonds.

Figure 2C:
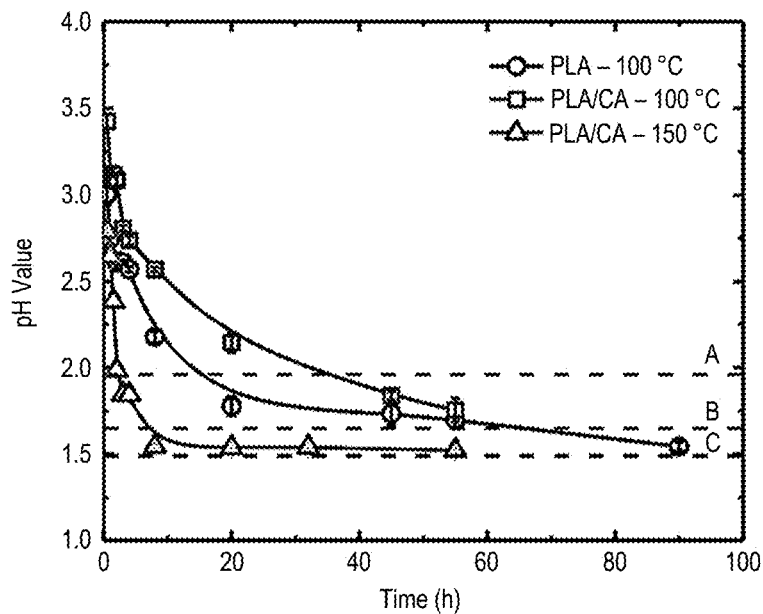

FIG. 2C is a graph showing pH values of aqueous solutions after hydrolysis at 100° C. Dotted lines A, B, and C respectively indicate the estimated pH value for 50 wt. % CA, 25 wt. % PLA, and 50 wt. % PLA in DI water after full hydrolysis of ester bonds.

Figure 2D:
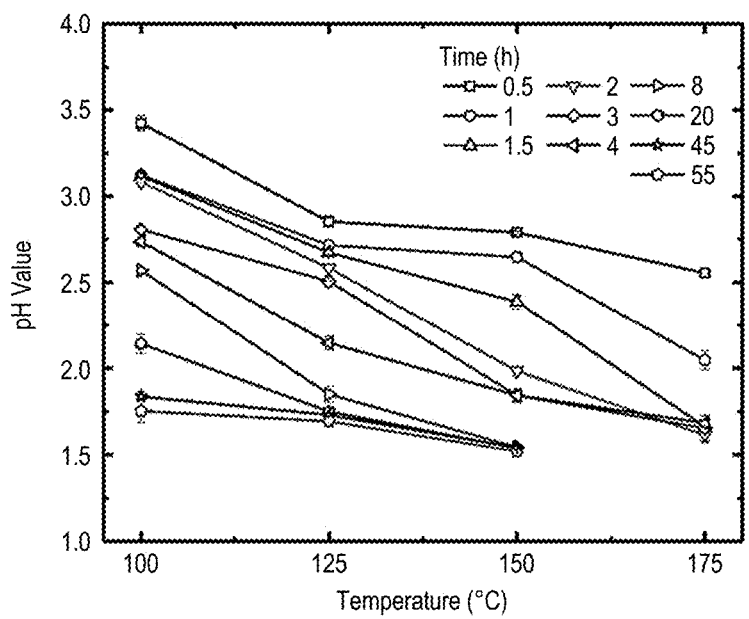

FIG. 2D is a graph showing pH values of aqueous solutions after hydrolysis at 150° C. Dotted lines A, B, and C respectively indicate the estimated pH value for 50 wt. % CA, 25 wt. % PLA, and 50 wt. % PLA in DI water after full hydrolysis of ester bonds.

Figure 3B:
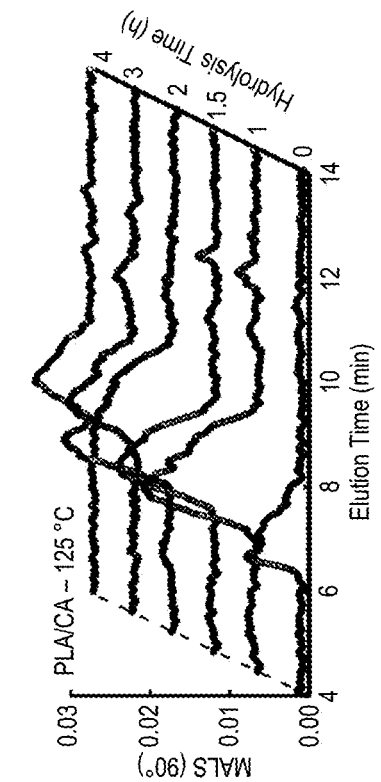
Figure 3D:
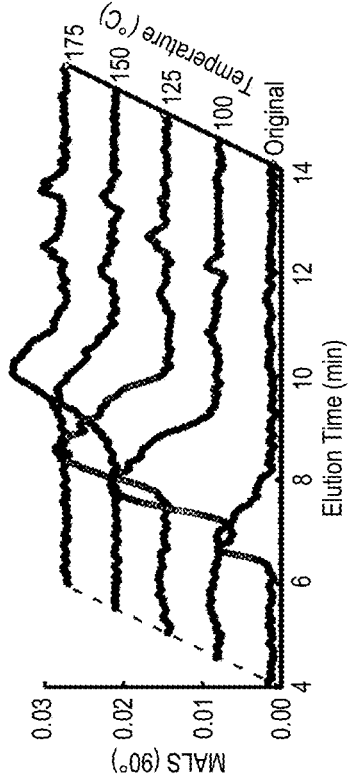
Figure 3A:
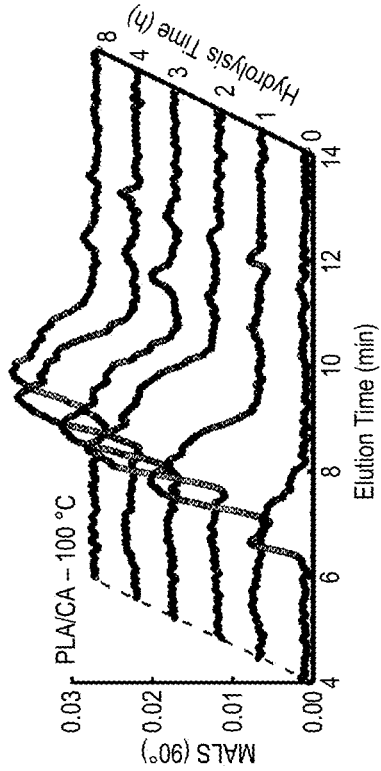

FIG. 3A shows multi-angle laser light scattering (MALS) trace curves of PLA molecules for PLA/CA fibers hydrolyzed at 100° C.

FIG. 3B shows MALS trace curves of PLA molecules for PLA/CA fibers hydrolyzed at 125° C.

Figure 3C:
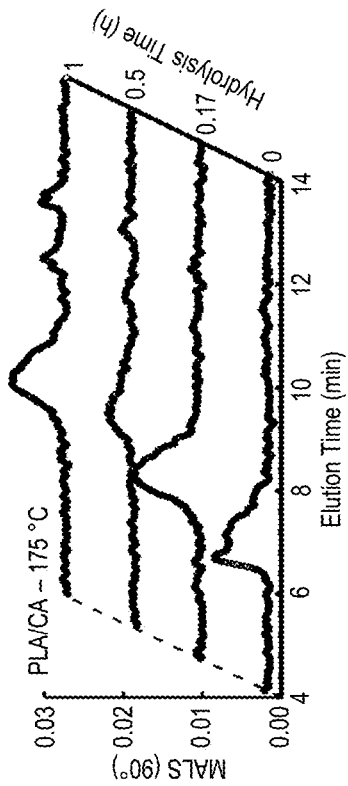

FIG. 3C shows MALS trace curves of PLA molecules for PLA/CA fibers hydrolyzed at 175° C.

FIG. 3D shows MALS trace curves of PLA molecules for PLA/CA fibers hydrolyzed for 1 hour at varied temperatures.

Figure 4:
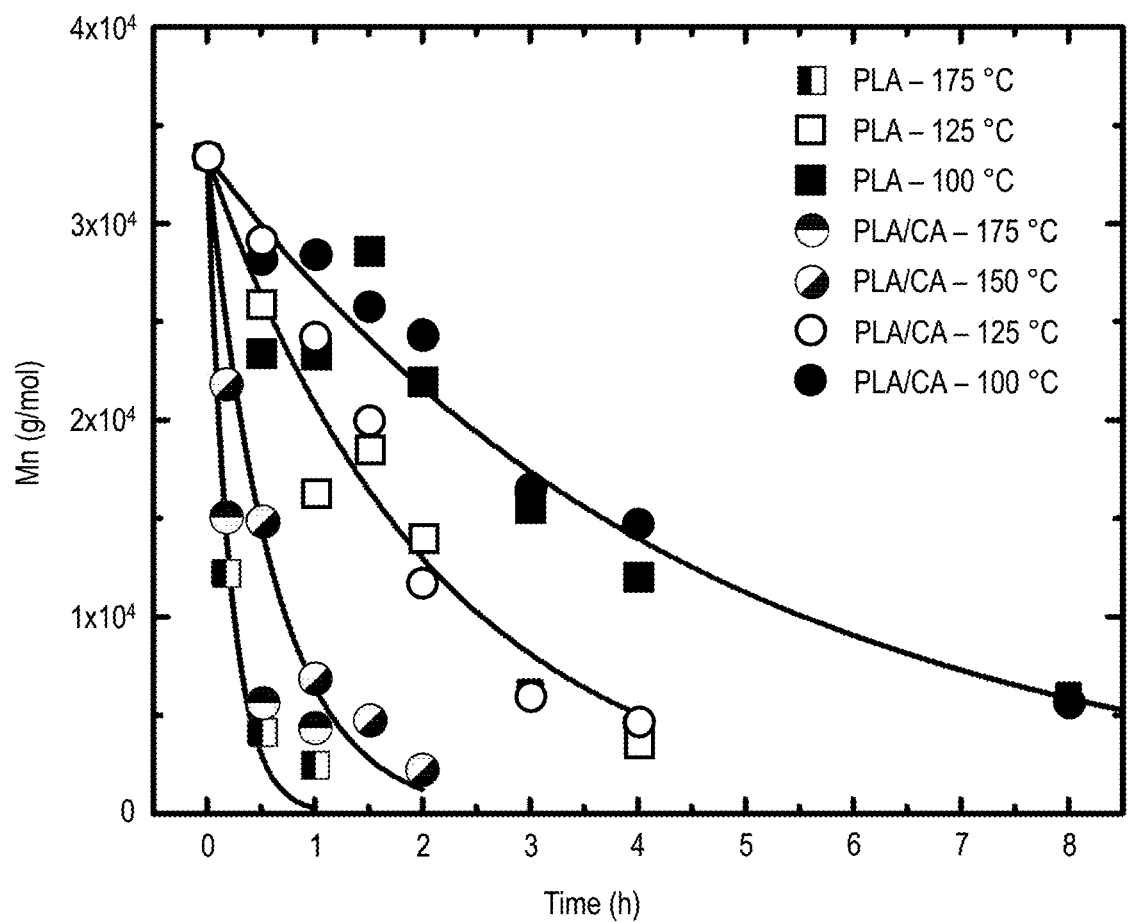

FIG. 4 is a graph showing number average molecule weight (Mn) of PLA fibers hydrolyzed at different temperatures as a function of hydrolysis time, where squares are pure PLA fibers and circles are PLA/CA fibers.

Figure 5:
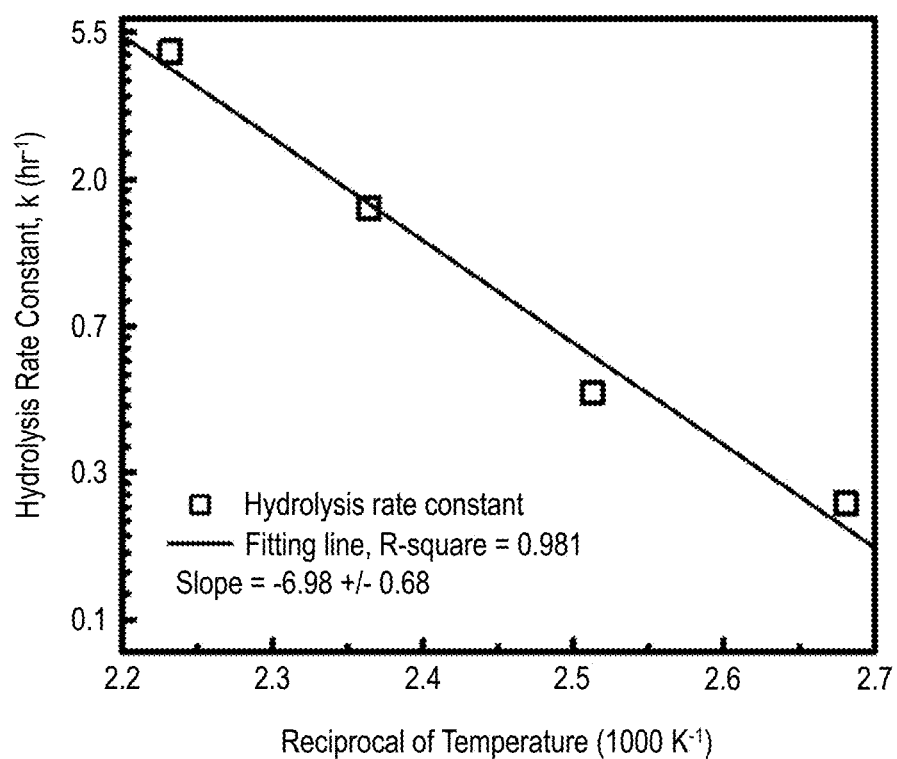

FIG. 5 is an Arrhenius plot of hydrolysis rate constant versus reciprocal of temperature.

Figure 6A:
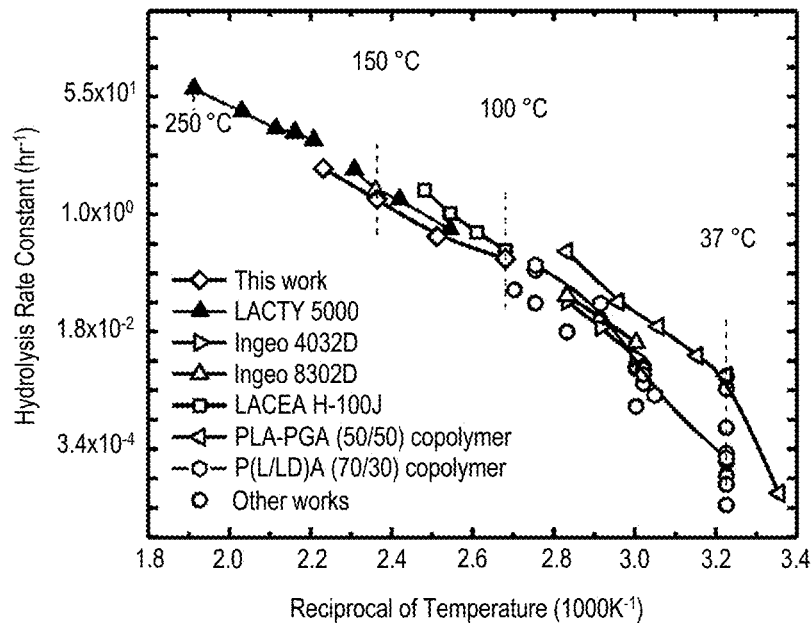

FIG. 6A is a graph showing known hydrolysis rate constants of PLA.

Figure 6B:
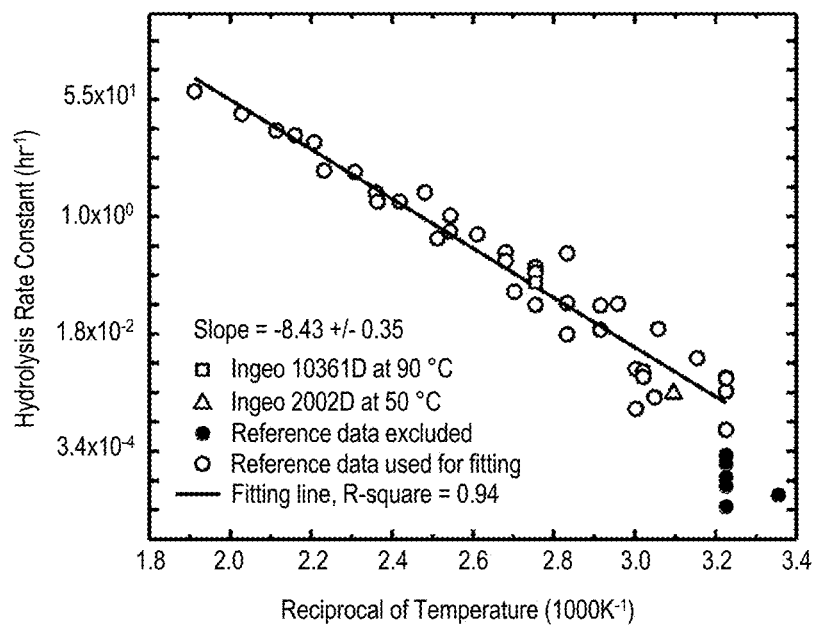

FIG. 6B is a linear regression analysis of reported data.

Figure 7A:
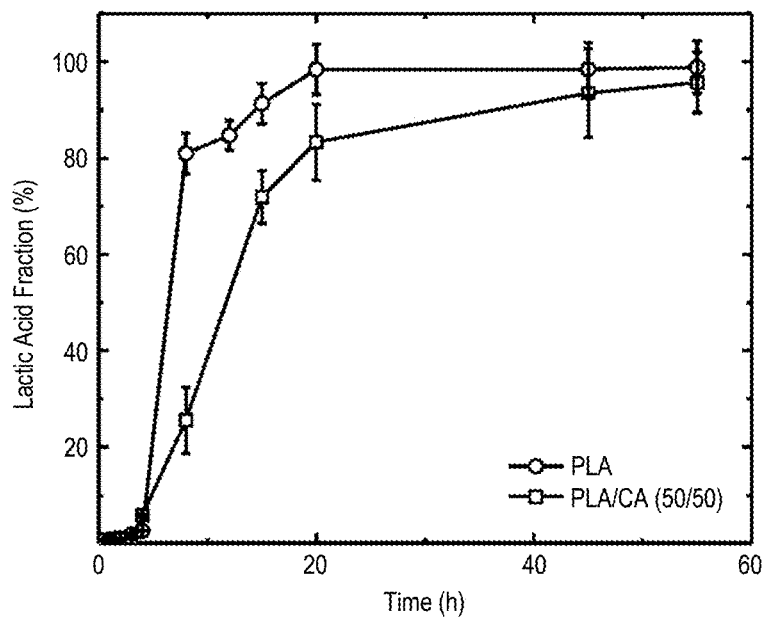

FIG. 7A is a graph showing the yield of lactic acid.

Figure 7B:
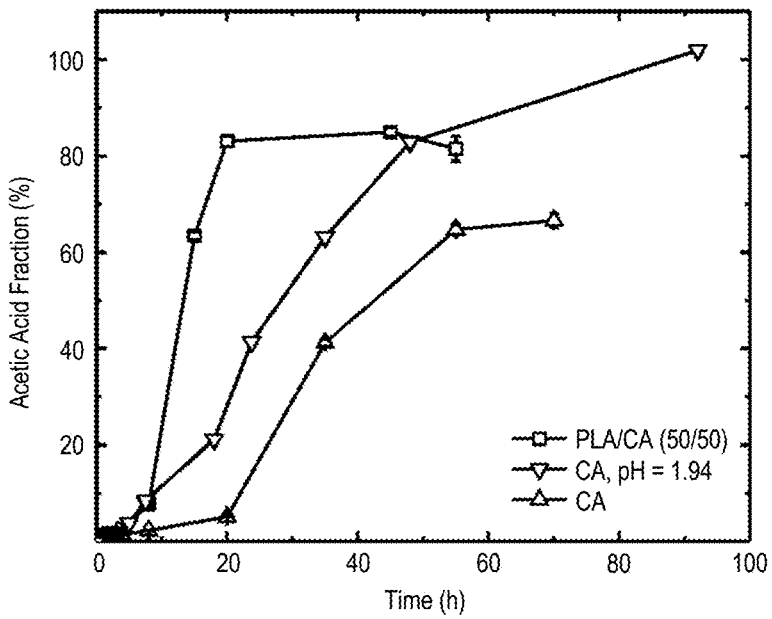

FIG. 7B is a graph showing the yield of acetic acid.

Figure 8A:
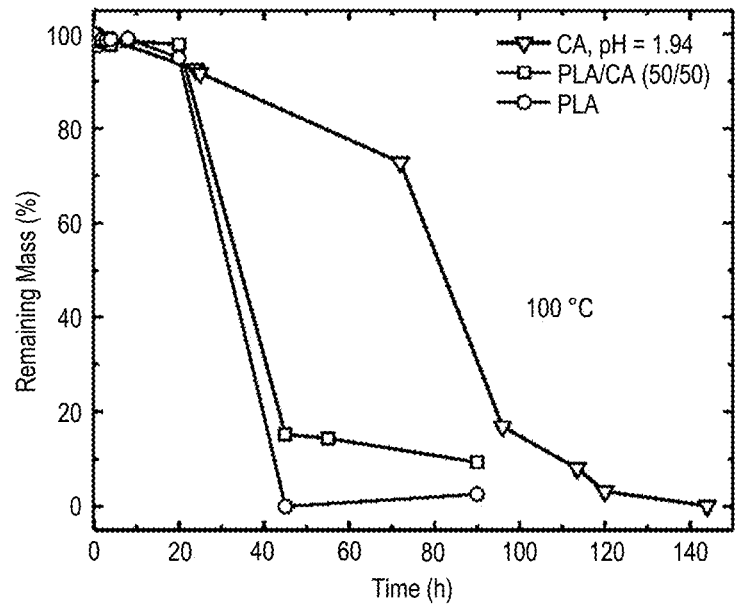

FIG. 8A is a graph showing mass loss of PLA and PLA/CA fibers hydrolyzed at 100° C.

Figure 8B:
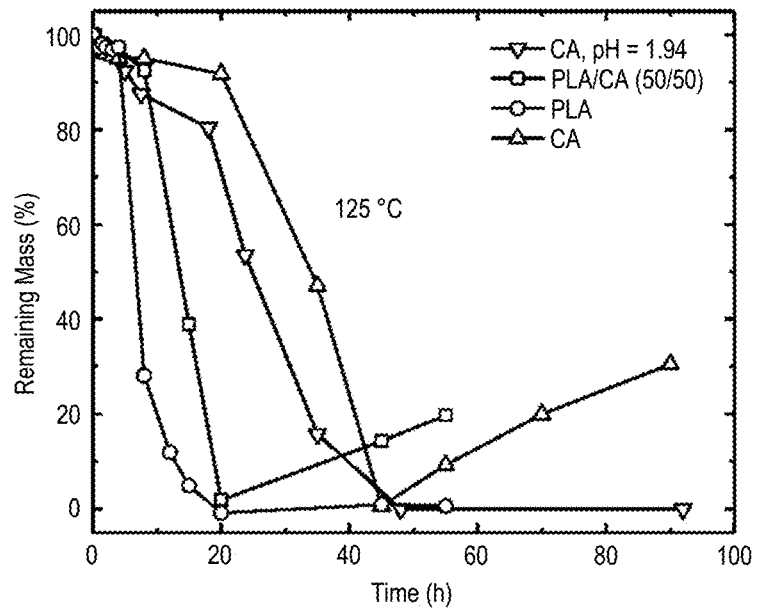

FIG. 8B is a graph showing mass loss of PLA and PLA/CA fibers hydrolyzed at 125° C.

Figure 8C:
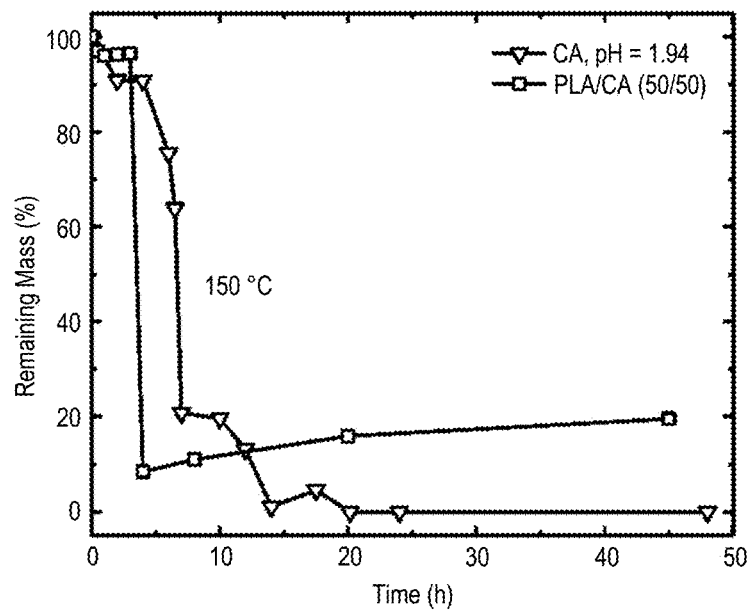

FIG. 8C is a graph showing mass loss of PLA and PLA/CA fibers hydrolyzed at 150° C.

Figure 8D:
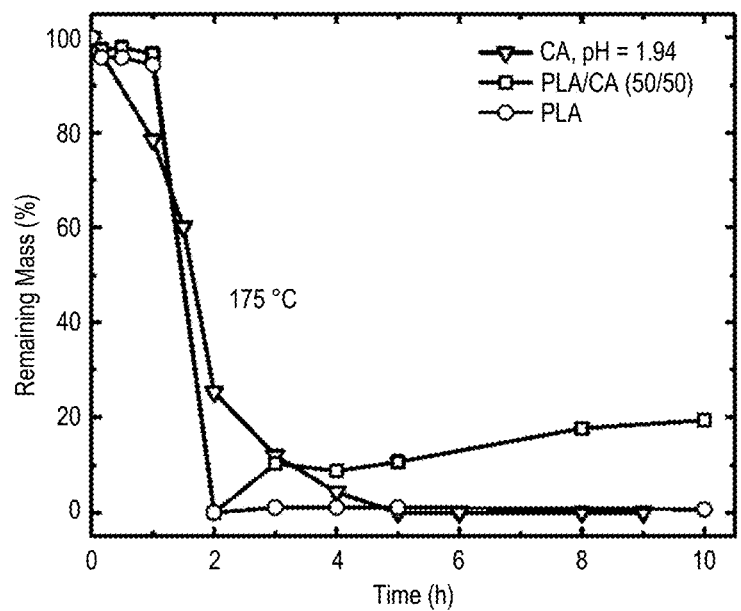

FIG. 8D is a graph showing mass loss of PLA and PLA/CA fibers hydrolyzed at 175° C.

Figure 9:
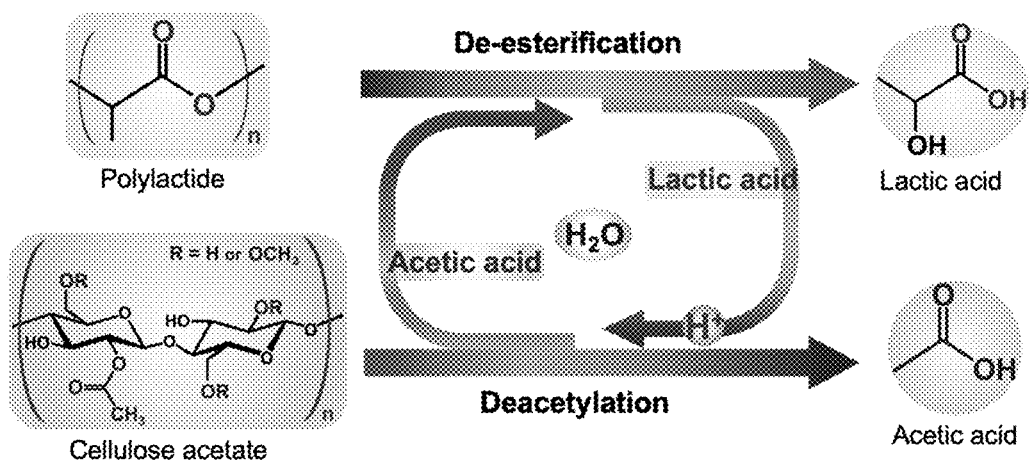

FIG. 9 is an illustration showing a parallel cascade reaction of hydrolysis of PLA/CA mixed fibers.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and B.

Example embodiments will now be described more fully with reference to the accompanying drawings.

The current technology provides a chemically synthesized system that mimics a natural biological enzyme cascade. Exemplary cascades have regulatory or control loops that affect reaction rates. More particularly, reaction products formed in the chemically synthesized system affect the reaction kinetics of parallel reactions occurring within the chemically synthesized system. The result is an overall reaction rate that is different from individual reaction rates of isolated reactions occurring within the system. That is, the system is biomimetic of natural enzyme cascades and exhibits molecular feedback.

Accordingly, the current technology provides a method of forming at least one regulatory loop in a system comprising more than one compound, such as a compound blend or mixture or a system comprising a plurality of compounds.

FIGS. 1A-1C show exemplary degradation reactions. In FIG. 1A, a first compound, Compound 1, forms a first degradation product, Degradation Product 1, at a first degradation rate defined by a first rate constant $k_1$. In FIG. 1B, a second compound, Compound 2, forms a second degradation product, Degradation Product 2, at a second degradation rate defined by a second rate constant $k_2$. In FIG. 1C, a third compound, Compound 3, forms a third degradation product, Degradation Product 3, at a third degradation rate defined by a third rate constant $k_3$. The rate constants $k_1$, $k_2$, and $k_3$ for the reactions of FIGS. 1A, 1B, and 1C, respectively, are not influenced by any factors outside of the reaction conditions, including, for example, solvents, temperatures, and pressures. As such, the rate constants $k_1$, $k_2$, and $k_3$ are referred to as "unmodified degradation rates" or "unmodified degradation rate constants." The degradation reactions are driven by mechanisms such as hydrolysis, acidolysis, aminolysis (including ammonolysis), alcoholysis (including methanolysis), pyrolysis, or combinations thereof, as non-limiting examples.

With reference to FIG. 1D, the method comprises combining a first composition comprising the first compound capable of forming the first degradation product at a first unmodified degradation rate defined by $k_1$ with a second composition comprising the second compound capable of forming a second degradation product at a second unmodified degradation rate defined by $k_2$ to form a compound blend. The resulting compound blend can be liquid or solid.

Exemplary solids include fibers having a diameter of less than or equal to about 1 mm, less than or equal to about 500 μm, or less than or equal to about 250 μm and a length to diameter ratio of greater than or equal to about 10, greater than or equal to about 100, or greater than or equal to about 1000. Other exemplary solids include particles having shapes individually selected from the group consisting of spheres, cylinders, cubes, flakes, irregular shapes having high surface area to volume ratios, and combinations thereof. The particles can be free flowing, having a mean particle diameter of less than or equal to about 25 mm, less than or equal to about 1 mm, or less than or equal to about 500 μm.

As shown in FIG. 1D, the method includes degrading Compound 1 and forming the first degradation product (Degradation Product 1), while simultaneously degrading Compound 2 and forming the second degradation product (Degradation Product 2). Degradation Product 2 modifies $k_1$ to $k_{1'}$. Because is different from $k_1$, at least one regulatory loop is formed in the compound blend. As further shown in FIG. 1D, Degradation Product 2 modifies $k_2$ to $k_{2'}$. Because $k_{2'}$ is different from $k_2$, two regulatory loops are formed in the compound blend. In various aspects, is less than $k_1$ and $k_{2'}$ is greater than $k_2$, is greater than $k_1$ and $k_{2'}$ is less than $k_2$, is greater than $k_1$ and $k_{2'}$ is greater than $k_2$, or is less than $k_1$ and $k_{2'}$ is less than $k_2$. As such, $k_1$ and $k_2$ are simultaneously modified to and $k_{2'}$ in the compound blend. By varying the relative concentrations of degradable compounds in the blend, the overall decomposition rate of the compound blend can be adjusted or modified.

When a degradation product results in a modified reaction rate that is faster than a corresponding unmodified reaction rate, a positive feedback loop is formed. Conversely, when a degradation product results in a modified reaction rate that is slower than a corresponding unmodified reaction rate, a negative feedback loop is formed. In certain aspects, a degradation product makes the reaction medium or environment more acidic or more basic, i.e., changes the pH, which causes the modification of the degradation rate of another compound.

The compound blend can include more than two compounds. As an example, FIG. 1E shows a compound blend comprising the three compounds individually shown in FIGS. 1A-1C. As shown in FIG. 1E, Compound 1 degrades into Degradation Product 1, Compound 2 degrades into Degradation Product 2, and Compound 3 degrades into Degradation Product 3, and $k_1$, $k_2$, and $k_3$ are simultaneously modified. For example, Degradation Product 1 modifies at least one of $k_2$ to $k_{2'}$ or $k_3$ to $k_{3'}$, Degradation Product 2 modifies at least one of $k_1$ to or $k_3$ to $k_{3'}$, and Degradation Product 3 modifies at least one of $k_1$ to or $k_2$ to $k_{2'}$. It is understood that the current technology contemplates compound blends including more than three compounds, in which at least one degradation product modifies the degradation rate of at least one other compound.

The degradation products described herein, e.g., Degradation Product 1, Degradation Product 2, and Degradation Product 3, can independently be a portion of the originating compound, e.g., Compound 1, Compound 2, or Compound 3, such as a functional group, a side chain, or a portion thereof, or a lower molecular weight version of the originating compound, such as a monomer, an oligomer, or a portion thereof. As a non-limiting example, polylactic acid can degrade to form degradation products including lactic acid and/or new polymer chains, one of which has an acid group resulting from the hydrolysis of an ester bond to yield the acid group and an alcohol group. This chain breakage resulting in acid groups provides the auto-catalytic, i.e., self-catalyzing, ability of polylactic acids and other polymers.

The compounds can individually be inorganic or organic, including biomolecules, such as peptides, polypeptides, or proteins. In some aspects, the compounds of the compound blend are independently selected from the group consisting of polyesters, esters, cellulose esters, carboxylic acids, alcohols, acyl halides, polyamides, amides, amines, polyurethanes, urethanes, isocyanates, aldehydes, polyketones, ketones, polyethers, ethers, polyepoxides, epoxides, polycarbonates, carbonates, anhydrides, polysulfones, sulfones, polysulfoxides, sulfoxides, polyolefins, alkanes, alkenes, alkynes, polyazides, azides, polynitriles, nitriles, nitros, polyarenes, lignin, arenes, polyphenols, phenols, carbohydrates, sugars, polythiols, thiols, organometalics, water, and combinations thereof, as non-limiting examples.

Regarding the polymers above, the compounds can be a polyester, such as (poly(bisphenol A isophthalate), poly (bisphenol A terephthalate), poly(butylene adipate), poly (butylene isophthalate), poly(butylene succinate), poly (butylene terephthalate), poly(ethylene sebacate), poly (ethylene succinate), poly(caprolactone), poly (cyclohexylenedimethylene terephthalate), poly(ethylene adipate), poly(ethylene isophthalate), poly(ethylene naphthalate), poly(ethylene phthalate), poly(ethylene terephthalate), polyglycolide, poly(hexylene sebacate), poly(hexylene succinate), poly(3-hydroxybutyrate), poly(4-hydroxybutyrate), polylactic acid, poly(propylene adipate), poly(trimethylene succinate), poly(trimethylene terephthalate), and combinations thereof; a polyolefin, such as poly(butylene), poly(butyl ethylene), poly(cyclohexylethylene), poly(ethylene), poly(heptylethylene), poly(hexylethylene), poly (isobutene), poly(isobutylethylene), poly(isopropylethylene), poly(2-methylbutene), poly(octylethylene), poly (pentylethylene), poly(propylene), poly(propylethylene), poly(tert-butylethylene), and combinations thereof; a polyhaloolefin, such as poly(chlrotrifluoroethylene), poly(tetrafluoroethylene) (PTFE), poly(vinyl bromide), poly(vinyl chloride) (PVC), poly(vinyl fluoride), poly(vinylidene chloride), poly(vinylidene fluoride) (PVDF), and combinations thereof; a polyamide, such as an aramid (e.g., poly paraphenylene terephthalamide (e.g., Kevlar®), poly metaphenylene terephthalamide (e.g., Nomex®), p-phenylene terephthalamide (PpPTA; Twaron®)), a nylon (e.g., poly (propiolactam) (nylon 3), poly(caprolactam) (nylon 6), polycapryllactam (nylon 8), poly(decano-10-lactam) (nylon 10), poly(undecano-11-lactam) (nylon 11), poly(dodecano-12-lactam) (nylon 12), poly(tetramethylene adipamide) (nylon 4,6), poly(hexamethylene adipamide) (nylon 6,6), poly (hexamethylene azelamide) (nylon 6,9), poly (hexamethylene sebacamide) (nylon 6,10), poly (hexamethylene dodecanediamide) (nylon 6,12), poly (decamethylene sebacamide) (nylon 10,10)), a poly (aspartate), a polyphthalamide, such as poly(hexamethylene isophthalamide) (PA 6I), poly(hexamethylene terephthalamide) (PA 6T), poly(nonanmethylene teraphthalamide) (PA 9T), and combinations thereof; a polymamide, such as poly(vinyl acetate), poly(ethylene-co-vinyl acetate), poly (methyl methacrylate), poly(vinyl chloride), poly(butylene adipate terephthalate), poly(butylene adipate), poly(ethylene adipate), polycaprolactone, polyhydroxyalkonates, and combinations thereof; and combinations thereof.

In other aspects, the first compound is selected from the group consisting esters, polyesters, and combinations thereof, and the second compound is selected from the group consisting of esters, polyesters, cellulose esters, amides, polyamides, water, methanol, ethylene glycol, low molecular weight amines, ammonia, mineral acids, organic acids, mineral bases, organic bases, and combinations thereof.

In an example, the first compound is polylactide; the second composition comprises water and the second compound, the second compound being cellulose acetate, cellulose acetate propionate copolymers, cellulose acetate butyrate copolymers, cellulose propionate, cellulose butyrate, or combinations thereof; and a first negative feedback loop is formed. The polylactide can be a product of polymerizing a mixture comprising LL-lactide monomers, LD-lactide monomers, and DD-lactide monomers. Additionally, the polylactide can have a degree or an amount of crystallinity resulting from heating, cooling, deformation, or combinations thereof. The degree or amount of crystallinity can be from crystalline to amorphous. Further, the polylactide can be branched as a result of being synthesized from a reaction mixture comprising either a multifunctional initiator selected from the group consisting of polyols, polysaccharides, poly(vinyl alcohol), mevalonolactone, glycidol, and combinations thereof or a branching agent selected from the group consisting of peroxides, trimethylolpropane tris (2-methyl-1-aziridinepropionate) (TTMAP), multifunctional acrylates, copolymers of styrene-glycidyl acrylate, and combinations thereof.

In another example, the first compound is polylactide; the second composition comprises water and the second compound, the second compound being poly(ethylene terephthalate), poly(ethylene terephthalate-co-ethylene naphthalate) copolymers, poly(ethylene napthalate), or combinations thereof; and a first positive feedback loop is formed.

In another example, the first compound is polycaprolactone; the second composition comprises water and the second compound, the second compound being polylactide; and a first positive feedback loop is formed.

In another example, the first compound is poly(hexamethylene adipamide); the second composition comprises water and the second compound, the second compound being polylactide; and a first positive feedback loop is formed.

In another example, the first compound is a biological protein; the second composition comprises water and the second compound, the second compound being polylactide; and a first positive feedback loop is formed.

In another example, the first compound is a biological protein; the second composition comprises water and the second compound, the second compound being polylactide; and a first negative feedback loop is formed.

In certain aspects, the compound blend is a polymer blend comprising at least a first compound and a second compound, the first and second compounds independently being polymeric fibers or polymeric particles.

The current technology also provides compositions resulting from the above methods. For example, the current technology provides a composition comprising a first compound that degrades and forms a first degradation product at a first degradation rate defined by and a second compound that degrades and forms a second degradation product at a second degradation rate defined by $k_{2'}$.

The first and second compound can be any compound described above, and the composition can be any fiber or particle described above. In the composition, is different from an unmodified degradation rate of the first compound defined by $k_1$ when the first compound is not combined with another compound, and $k_{2'}$ is different from an unmodified degradation rate of the second compound defined by $k_2$ when the second compound is not combined with another compound.

Embodiments of the present technology are further illustrated through the following non-limiting example.

Example

Summary

Biological systems often involve cascading molecular signals; for example, blood coagulation is conserved across all mammals and activation involves a cascade of enzymatic reactions. Here, inspiration is drawn from such complex systems to demonstrate, through a simple example, the purposeful design of a cascade system that enables control over polymer degradation kinetics. Micron-size fibers of polylactide (PLA) and cellulose acetate (CA) are combined and subjected to hydrolysis conditions. Cleavage of the PLA produces an acid group which catalyzes the CA hydrolysis, thus demonstrating the use of synthetic molecular signaling. Furthermore, the presence of CA inhibits the degradation of PLA, thereby demonstrating molecular feedback, another hallmark of biological molecular cascades. The parallel reaction cascade causes the primary hydrolysis rate constant of CA to increase by 400% (from 0.028 hr$^{-1}$ to 0.14 hr$^{-1}$); furthermore, as a result of molecular feedback, the rate constant for PLA hydrolysis decreases by 52% (from 0.23 hr$^{-1}$ and 0.11 hr$^{-1}$). The results demonstrate that synthetic signaling enables tunable hydrolysis rate kinetics. Possible technological applications are wide ranging and encompass degradable biological scaffolds, better materials for hydraulic fracturing, and improved recycling of mixed plastic wastes.

DESCRIPTION

Biomimetic chemocatalytic cascades can be adopted for designing polymer degradation processes. In this example, such synthetic degradation cascades are reduced to practice using two synthetic polymers that are capable of undergoing hydrolysis. Hydrolysis of cellulose acetate (CA) fibers and poly(lactic acid) (PLA) fibers is conducted at high temperatures, above 100° C., where biologically derived catalysts would be deactivated. Data provide a clear demonstration for both direct and feedback molecular signaling in a synthetically derived polymer system.

CA is derived by chemically modifying natural cellulose. Hydrolysis of CA can occur under various aqueous conditions and typically involves deacetylation of the acetate side chains first (due to relatively fast kinetics) and a subsequent depolymerization of the cellulose backbone via cleavage of the $\beta_{1-4}$ glycosidic bond. Higher temperatures and strong acid or base conditions can promote the hydrolysis rate of CA. For instance, both base- and acid-catalyzed hydrolysis of CA membranes have been conducted over a range of temperatures (23-95° C.), and it was found that there is a "V" shape relationship between hydrolysis rate and pH value—i.e., either low pH or high pH conditions accelerate the hydrolysis rate, while pH values in a mid-range of 4-5 result in a relatively low hydrolysis rate.

PLA is a bio-based and biodegradable polymer obtained by polymerizing lactide monomers. Lactide is obtained from lactic acid, which in turn comes from the biochemical transformation of plant-based sugars. The degradability of PLA is a crucial property that enables important applications, including sutures, biomedical devices, controlled release, compostable plastics packaging, and oilfield products. The degradability of PLA under varied conditions, including temperatures, enzymes, pH values, morphologies, crystallinity, and vivo and vitro environments, has been described. Generally, degradability of PLA is related to hydrolysis of its ester bonds, which may be an auto-catalytic random chain scission.

Individual hydrolysis of PLA or CA has been shown under varied conditions; however, the hydrolysis behavior of PLA/CA blends with high solid content and high temperature has never been reported. Lactic acid and acetic acid are generated from the hydrolysis of PLA and CA, respectively. These degradation products have different acid dissociation constants that affect the pH value of the reaction medium and influence the hydrolysis condition of remaining ester bonds. Therefore, the hydrolysis behavior of PLA/CA mixed fibers serves as a prototypical example of a synthetically designed, biomimetic cascade providing a controllable rate of chemical degradation.

In this example, the hydrolysis of PLA/CA mixed fibers is designed to mimic a parallel enzyme cascade reaction; the lactic acid generated from PLA provides the cofactor for the second generated acetic acid from CA, and vice versa. Specifically, hydrolysis of pure PLA fibers, PLA/CA mixed fibers, and pure CA fibers in an aqueous environment with a high solid content (50 wt. %) and high temperature range (100-175° C.) exhibit a biomimetic parallel cascade reaction. The molecular weight time evolution of PLA, production of lactic acid, and production of acetic acid are measured to analyze the hydrolysis kinetics of these compositions.

Experimental

Materials.

CA fibers were provided by the Eastman Chemical Company in the form of 6 mm long chopped fibers. CA has an average acetyl content of 39.4 wt. % (DS=2.48) and are solvent spun from acetone with an octagonal cross-section and diameter of from about 15 μm to about 30 μm. PLA (Mn=3.3×10$^{-4}$ g/mol, PDI=1.42) fibers were provided by Greenstar Company in the form of 5 mm long chopped fibbers with a diameter of about 15 μm.

Hydrolysis.

Hydrolysis of fibers is carried out in sealed stainless-steel Swagelok reactors. For a specific specimen, 10 grams of fibers (either 10 grams PLA fibers, a mixture of 5 grams PLA and 5 grams CA fibers, or 10 grams CA fibers) and 10 grams deionized (DI) water are loaded in stainless-steel Swagelok reactors pre-purged with argon. The samples are then loaded into a pre-heated oven resting upon an VWR 3500 orbital shaker. During hydrolysis, the samples are agitated by shaking the containing oven at a constant speed of 75 rpm. Hydrolysis temperatures were 100, 125, 150, and 175° C. Once a pre-determined hydrolysis period is reached, the reactor is removed from the oven and immediately quenched in ice water. The aqueous solution is recovered and tested to determine pH and concentrations of lactic acid and acetic acid. The solid phase of residual PLA and CA fibers is collected, rinsed with DI water, and vacuum dried for 48 hours at 60° C. Dried samples are weighed to determine mass loss. To compare the effect of PLA fibers on the hydrolysis rate of CA fibers, CA fibers hydrolyzed in strong acidic buffer solution with pH=1.94 are also investigated (0.1 grams CA fibers in 25 ml buffer solution composed of 0.115 M citric acid monohydrate and 0.061 M sodium chloride).

Characterization.

The molecular weight of PLA is measured using a gel permeation chromatography (GPC) with light scattering detection (DAWN®, Wyatt technology) and an interferometric refractometer (OPTILAB®, Wyatt technology). Chloroform is used as the solvent, the dilute solutions are filtered through a 0.22 μm syringe filter before injection into the GPC system, and the eluent flow rate is fixed at 1 ml/min. The pH values of the aqueous solution after hydrolysis are measured using a benchtop pH meter (FiveEasy F20) at room temperature and averaged over triplicate measurements.

The concentration of lactic acid and acetic acid in the aqueous solution after hydrolysis is measured by liquid chromatography-mass spectrometry (LC-MS, Waters Acquity LC system coupled to a Waters TQ-D triple quadrupole mass spectrometer) and gas chromatography-mass spectrometry (GC-MS, Agilent 6890 GC/5975B MS system), respectively. For LC-MS measurement, the LC flow rate is 0.5 mL/min. Sample ionization is via negative-mode electrospray ionization (ESI), with source parameters including an ESI voltage of −3 kV, a source temperature of 150° C., a desolvation temperature of 500° C., a cone gas flow of 45 L/h, and a desolvation gas flow of 800 L/h. For GC-MS measurement, 1 μL of sample is delivered into the GC inlet, which is maintained at 250° C. with a 10:1 split flow and a 1-minute purge time. The temperature of the GC oven is gradually raised from 50° C. to 120° C. at 7° C./min, followed by heating to 240° C. at 40° C./min and holding for 3 minutes to ensure a clean baseline.

Results and Discussion pH values. The representative pH values of the aqueous solutions after hydrolysis are presented in FIGS. 2A-2D. The pH values gradually decrease with increasing hydrolysis time and then level off, illustrating acetic acid or lactic acid generation through the hydrolysis process. For any specific reaction time, higher hydrolysis temperatures result in lower pH values, indicating that higher temperatures promote the hydrolysis rate. Generally, samples from PLA/CA fibers give higher pH values at early stages. As shown in FIG. 2B, compared with pure CA hydrolyzed at 125° C., PLA/CA fibers give much lower pH values and faster pH drops due to the molecular signaling effects of the higher acidity of lactic acid. The result is an increased hydrolysis rate of CA in PLA/CA mixtures compared to CA alone.

Hydrolysis Rate Constant from PLA Molecular Weight Degradation.

The hydrolysis of PLA depends on various parameters, including percent crystallinity, morphology, and hydrolysis conditions including temperature and pH of the medium. Among these experimental parameters, hydrolysis temperature has a very significant influence on the degradation rate.

At the early stage of hydrolysis in this example, the mass of fibers changed very little, with only a small amount of acids being generated. In this initial stage, PLA undergoes chain scission, resulting in decreased molecular weight. This initial stage was found to be within 1.5, 2, 4, and 8 hours for both PLA fibers and PLA/CA fibers hydrolyzed at 175, 150, 125, and 100° C., respectively. The PLA molecular weight changes during the initial stage are determined using GPC; multi-angle light scattering (MALS) trace curves are presented in FIGS. 3A-3D. All the peaks shift to longer elution time with increasing hydrolysis time, corresponding to decreasing molecular weight with increased reaction time. As shown in FIG. 3D, the curve peak at a given reaction time shifts to longer elution time at higher hydrolysis temperatures.

The changes in number average molecular weight of PLA fibers during the initial stage are presented in FIG. 4. The existence of CA fibers has no obvious effect on the molecular weight changes of PLA fibers at the initial stage, but the temperature significantly influences the hydrolysis rate. The molecular weight decreases exponentially with the hydrolysis time. Based on the degradation of molecular weight, the hydrolysis rate constant is obtained according to the following equation, $$M_n(t) = M_{n,0} e^{-kt} \tag{1}$$

where k is the hydrolysis rate constant, and $M_{n,0}$ and $M_n(t)$ are the initial number average molecular weight and number average molecular weight at hydrolysis time t, respectively. By fitting Equation 1, the hydrolysis rate constant is obtained and listed in Table 1; the rate constants are 0.22, 0.47, 1.65, and 4.79 hr$^{-1}$ for 100, 125, 150, and 175° C., respectively.

TABLE 1

Linear fitting data of natural logarithm of molecular weight as a function of time.

| | 100° C. | 125° C. | 150° C. | 175° C. |
|---|---|---|---|---|
| k (hr$^{-1}$) | 0.22 ± 0.02 | 0.47 ± 0.03 | 1.65 ± 0.02 | 4.79 ± 0.75 |
| R$^2$ | 0.956 | 0.979 | 0.976 | 0.975 |

The activation energy of hydrolysis for PLA fibers in the tested temperature range can be obtained through the Arrhenius relationship given in Equation 2, $$k = A e^{-E_a/RT} \tag{2}$$

where k is the hydrolysis rate constant, $E_a$ is the activation energy, A is the collision pre-factor, R is the universal gas constant, and T is the temperature in Kelvin. The Arrhenius plots for the obtained hydrolysis rates are shown in FIG. 5. The calculated activation energy for PLA is 13.9 kcal/mol, which is consistent with some previous reports. Slightly lower values of 11.8 kcal/mol were reported for the temperature range of 170-250° C., while higher values of 16.6 kcal/mol were found for the range of 120-160° C. A seemingly anomalous value of 20.8 kcal/mol has been reported over the limited temperature range of 100-130° C.

The reported hydrolysis rate constants of PLA with varied molecular structures, crystallinity, and morphologies under different temperatures and environments are presented in FIG. 6A. The reported hydrolysis rate constant of PLA varies from $2.5 \times 10^{-5}$ hr$^{-1}$ to 71 hr$^{-1}$ over the temperature range of 37-250° C. The unmodified PLA hydrolysis rate constants obtained in this example are in good agreement with most reported values. As shown in in FIG. 6B, the majority of reported rate constant data from different works is described by the Arrhenius equation over the temperature range from 37-250° C. When the most obvious outliers are excluded from the data, the activation energy for PLA hydrolysis is 16.8 kcal/mol and the collision pre-factor is 1.12 hr$^{-1}$.

Parallel Cascade Reaction.

The parallel cascade reaction of PLA/CA mixed fibers can be examined by following the time evolution of the lactic acid and acetic acid present in the mixtures. The amount of lactic acid and acetic acid generated from PLA and CA fibers hydrolyzed at 125° C. was independently measured by LC-MASS and GC-MASS, respectively. Measuring the production rate of lactic and acetic acids during hydrolysis provides clear evidence for molecular feedback loops. In FIGS. 7A-7B, the moles of acids released divided by the expected amount if complete hydrolysis of all ester bonds occurs (acid yield) versus hydrolysis time are presented. As shown in FIG. 7A, a three-stage process is observed for the generation of lactic acid—the initial stage is between 0 to 4 hours, the primary yield stage is between 4 to 20 hours, and the final stage is between 20 to 55 hours. The inhibitory feedback effect of CA is easily distinguished—to obtain an 80% yield of lactic acid requires about 8 hours for PLA alone, whereas this same yield for PLA/CA mixtures requires 20 hours of reaction time.

FIG. 7B shows that acetic acid yield as a function of time also depends on the initial composition. PLA/CA mixed fibers show an initial yield stage between 0 to 8 hours and a primary yield stage between 8 to 20 hours. In contrast, both pure CA fibers in DI water or in an acidic medium (pH=1.94) show an initial yield stage between 0 to 20 hours and a primary yield stage between 20 to 55 hours. This dramatic speed-up in the yield of acetic acid due to simultaneous PLA degradation establishes the molecular signaling in the synthetically derived biomimetic cascade.

As shown in FIGS. 8A-8D, these acid yield results coincide with mass loss of fibers, where only a small amount of mass loss was observed between 0 to 4 hours, while most mass loss was observed between 4 to 20 hours. The majority of measured mass loss for both PLA and PLA/CA mixed fibers is between 1 to 2, 3 to 4, 8 to 20, and 20 to 45 hours for hydrolysis at 175, 150, 125, and 100° C., respectively. in contrast, for CA fibers tested in DI water (initial pH=5.75, 10 grams CA fibers in 10 ml water), the majority of mass loss occurs much later—between 20 to 45 hours. Accordingly, the presence of PLA in the physical mixture is clearly shown to accelerate CA mass loss. This provides additional evidence for molecular signaling.

This detailed example is not limiting regarding the application of the principles described herein. It is one example that illustrates that physical blends of PLA and CA fibers exhibit molecular signaling, including feedback, in a manner analogous to biological enzyme cascades. The utility of such synthetic cascades rests in the ability to provide an efficient method to manipulate material degradation rates. As shown in the schematic in FIG. 9, the generated lactic acid and acetic acid join the remaining reaction by altering the pH of the medium. Lactic acid generated from PLA fibers has an acid dissociation constant of $1.38 \times 10^{-4}$, while acetic acid generated from CA has an acid dissociation constant of $1.58 \times 10^{-5}$. Thus, lactic acid provides a stronger acidic environment, which boosts the deacetylation reaction rate, while acetic acid reduces acidity and thus retards PLA hydrolysis. In this manner, the generated acids serve as cofactors in a synthetically designed biomimetic parallel reaction cascade.

CONCLUSIONS

In this example, the hydrolysis of PLA/CA mixed fibers were designed to mimic an enzymatic parallel reaction cascade. The mutual effects of PLA and CA on the hydrolysis behavior of PLA/CA compositions was investigated using fibers in the temperature range of 100-175° C. The pH values decrease with increasing hydrolysis time and level off. The presence of PLA produces a molecular signaling that promotes the primary hydrolysis of CA fibers, resulting in the CA hydrolysis rate constant increasing from 0.028 hr$^{-1}$ and 0.14 hr$^{-1}$. Also, the presence of CA fibers produces a molecular feedback signal that reduces the hydrolysis rate of PLA fibers, resulting in the hydrolysis rate constant for PLA decreasing from 0.23 hr$^{-1}$ to 0.11 hr$^{-1}$. This example shows that synthetic biomimetic cascades can be designed and implemented as an efficient route to control the degradation of a wide variety of materials.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of simultaneously modifying degradation rates of at least two compounds comprising a first compound having a first unmodified degradation rate constant $k_1$ and a second compound having a second unmodified degradation rate $k_2$, the method comprising:
    combining a first composition comprising the first compound with a second composition comprising the second compound;
    degrading the first compound and forming a first degradation product; and
    degrading the second compound and forming a second degradation product,
    wherein the second degradation product modifies the first unmodified degradation rate constant $k_1$ of the first compound to a first modified degradation rate $k_{1'}$ and the first degradation product modifies the second unmodified degradation rate $k_2$ of the second compound to a second modified degradation rate $k_{2'}$,
    wherein either a first negative feedback loop is formed when is less than $k_1$ or a first positive feedback loop is formed when is greater than $k_1$, and
    wherein either a second negative feedback loop is formed when $k_{2'}$ is less than $k_2$ or a second positive feedback loop is formed when $k_{2'}$ is greater than $k_2$.

2. The method according to claim 1, wherein the first compound and the second compound are independently selected from the group consisting of polyesters, esters, cellulose esters, carboxylic acids, alcohols, acyl halides, polyamides, amides, amines, polyurethanes, urethanes, isocyanates, aldehydes, polyketones, ketones, polyethers, ethers, polyepoxides, epoxides, polycarbonates, carbonates, anhydrides, polysulfones, sulfones, polysulfoxides, sulfoxides, polyolefins, alkanes, alkenes, alkynes, polyazides, azides, polynitriles, nitriles, nitros, polyarenes, lignin, arenes, polyphenols, phenols, carbohydrates, sugars, polythiols, thiols, organometalics, and combinations thereof.

3. The method according to claim 1, wherein the first compound and the second compound independently degrade by a mechanism selected from the group consisting of hydrolysis, acidolysis, alcoholysis, aminolysis, ammonolysis, pyrolysis, and combinations thereof.

4. The method according to claim 1, wherein the first compound is selected from the group consisting of esters, polyesters, and combinations thereof, and the second compound is selected from the group consisting of esters, polyesters, cellulose esters, amides, polyamides, water, methanol, ethylene glycol, low molecular weight amines, ammonia, mineral acids, organic acids, mineral bases, organic bases, and combinations thereof.

5. The method according to claim 1, wherein the first compound is polylactide; the second composition comprises water and the second compound, the second compound being cellulose acetate, cellulose acetate propionate copolymers, cellulose acetate butyrate copolymers, cellulose propionate, cellulose butyrate, or combinations thereof; and the first negative feedback loop is formed.

6. The method according to claim 5, wherein the polylactide is a product of polymerizing a mixture comprising LL-lactide monomers, LD-lactide monomers, and DD-lactide monomers.

7. The method according to claim 5, wherein the polylactide has a degree of crystallinity resulting from heating, cooling, deformation, or combinations thereof.

8. The method according to claim 5, wherein the polylactide is branched, the polylactide being synthesized from a reaction mixture comprising either a multifunctional initiator selected from the group consisting of polyols, polysaccharides, poly(vinyl alcohol), mevalonolactone, glycidol, and combinations thereof or a branching agent selected from the group consisting of peroxides, trimethylolpropane tris (2-methyl-1-aziridinepropionate) (TTMAP), multifunctional acrylates, copolymers of styrene-glycidyl acrylate, and combinations thereof.

9. The method according to claim 1, wherein the first compound is polylactide; the second composition comprises water and the second compound, the second compound being poly(ethylene terephthalate), poly(ethylene terephthalate-co-ethylene naphthalate) copolymers, poly(ethylene napthalate), or combinations thereof; and the first positive feedback loop is formed.

10. The method according to claim 1, wherein the first compound is polycaprolactone, and the second composition comprises water and the second compound, the second compound being polylactide.

11. The method according to claim 1, wherein the first compound is poly(hexamethylene adipamide); the second composition comprises water and the second compound, the second compound being polylactide; and the first positive feedback loop is formed.

12. The method according to claim 1, wherein the first compound is a biological protein; the second composition comprises water and the second compound, the second compound being polylactide; and the first positive feedback loop is formed.

13. The method according to claim 1, wherein the first compound is a biological protein; the second composition comprises water and the second compound, the second compound being polylactide; and the first negative feedback loop is formed.

14. The method according to claim 1, wherein the first compound comprises polymeric fibers having a diameter of less than or equal to about 1 mm and a length to diameter ratio of greater than or equal to about 10.

15. The method according to claim 1, wherein the combining the first composition with the second composition results in fibers comprising the first and second compounds, the fibers having a diameter of less than or equal to about 1 mm and a length to diameter ratio of greater than or equal to about 10.

16. The method according to claim 1, wherein the first compound and the second compound are particles having shapes individually selected from the group consisting of spheres, cylinders, cubes, flakes, and irregular shapes having high surface area to volume ratios.

17. The method according to claim 1, wherein the combining the first composition with the second composition results in particles comprising the first and second compounds, the particles having shapes selected from the group consisting of spheres, cylinders, cubes, flakes, and irregular shapes having high surface area to volume ratios.

18. The method of claim 17, wherein the particles are free flowing and have a mean particle diameter of less than or equal to about 2.5 cm.

19. A method of forming at least one regulatory loop for controlling reaction rates in a polymer blend, the method comprising:
combining a first composition comprising a first compound capable of forming a first degradation product at a first unmodified degradation rate defined by $k_1$ with a second composition comprising a second compound capable of forming a second degradation product at a second unmodified degradation rate defined by $k_2$ to form the polymer blend,
wherein the second degradation product is formed in the polymer blend and modifies $k_1$ to $k_{1'}$, and
wherein the first degradation product is formed in the polymer blend and modifies $k_2$ to $k_{2'}$.

20. The method according to claim 19, wherein is less than $k_1$ and $k_{2'}$ is greater than $k_2$.

21. The method according to claim 19, wherein is greater than $k_1$ and $k_{2'}$ is less than $k_2$.

22. The method according to claim 19, wherein the first compound is polylactic acid and the second compound is cellulose acetate.

23. The method according to claim 19, further comprising:
combining a third composition with the first composition and the second composition, the third composition comprising a third compound being capable of forming a third degradation product at a third unmodified degradation rate defined by $k_3$,
wherein at least one of the first degradation product or the second degradation product modifies $k_3$ to $k_{3'}$.

24. A composition comprising:
a first compound that degrades and forms a first degradation product at a first degradation rate defined by $k_{1'}$; and
a second compound that degrades and forms a second degradation product at a second degradation rate defined by $k_{2'}$;

wherein is different from an unmodified degradation rate of the first compound defined by $k_1$ when the first compound is not combined with another compound, and wherein $k_{2'}$ is different from an unmodified degradation rate of the second compound defined by $k_2$ when the second compound is not combined with another compound.

25. The composition according to claim 24, wherein the first compound and the second compound are polymers.

26. The composition according to claim 24, wherein the composition is in the form of a fiber.

27. The composition according to claim 26, wherein the fiber has a diameter of less than or equal to about 1 mm and a length to diameter ratio of greater than or equal to about 10.

28. The composition according to claim 24, wherein the composition is in the form of a particle having a shape selected from the group consisting of a sphere, a cylinder, a cube, a flake, and an irregular shape having a high surface area to volume ratio.

29. The composition according to claim 24, wherein $k_{1'}$ is less than $k_1$ and $k_{2'}$ is greater than $k_2$.

30. The composition according to claim 24, wherein $k_{1'}$ is greater than $k_1$ and $k_{2'}$ is less than $k_2$.

* * * * *